(12) United States Patent
Inoue

(10) Patent No.: US 7,075,710 B2
(45) Date of Patent: Jul. 11, 2006

(54) RAMAN AMPLIFICATION METHOD, RAMAN AMPLIFICATION PUMPING UNIT, AND WDM OPTICAL COMMUNICATION SYSTEM

(75) Inventor: Masayuki Inoue, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 219 days.

(21) Appl. No.: 10/358,144

(22) Filed: Feb. 5, 2003

(65) Prior Publication Data

US 2003/0147124 A1    Aug. 7, 2003

(30) Foreign Application Priority Data

Feb. 7, 2002    (JP) ............................ P2002-031291

(51) Int. Cl.
*H04B 10/12* (2006.01)
*H01S 3/00* (2006.01)

(52) U.S. Cl. .................. 359/334; 359/337.12
(58) Field of Classification Search ............... 359/334, 359/337.12
See application file for complete search history.

(56) References Cited

U.S. PATENT DOCUMENTS

| | | | |
|---|---|---|---|
| 6,229,641 B1* | 5/2001 | Kosaka | 359/337 |
| 6,292,288 B1* | 9/2001 | Akasaka et al. | 359/334 |
| 6,611,370 B1* | 8/2003 | Namiki et al. | 359/334 |
| 6,697,187 B1* | 2/2004 | Seydnejad et al. | 359/334 |
| 6,704,134 B1* | 3/2004 | Yokoyama | 359/334 |
| 6,891,661 B1* | 5/2005 | Hayashi et al. | 359/334 |
| 2004/0075888 A1* | 4/2004 | Eiselt | 359/337.13 |

FOREIGN PATENT DOCUMENTS

JP    10-150414    6/1998

* cited by examiner

*Primary Examiner*—Jack Keith
*Assistant Examiner*—Eric Bolda
(74) *Attorney, Agent, or Firm*—McDermott Will & Emery LLP

(57) ABSTRACT

This invention provides a Raman amplification method and the like having a structure which can properly adjust a pumping light power in accordance with a loss change in signal light and can easily flatten a gain spectrum. In the Raman amplification method according to this invention, part of Raman-amplified propagating light is branched by an optical branching device. Of the branched propagating light, at least light components having two predetermined wavelengths are demultiplexed by an optical demultiplexer. The powers of the light components having the two wavelengths are detected. The amounts of loss changes in the light components having the two wavelengths and the slope of an approximate line representing the correlation between the wavelength and the amount of loss change are obtained on the basis of these powers. The optical power of each pumping channel output from an associated one of a plurality of pumping light sources included in a Raman amplification pumping unit is adjusted on the basis of the amount of loss change and the slope of the approximate line.

11 Claims, 11 Drawing Sheets

RAMAN AMPLIFICATION METHOD, RAMAN AMPLIFICATION PUMPING UNIT, AND WDM OPTICAL COMMUNICATION SYSTEM

BACKGROUND OF THE INVENTION

1. Field of the Invention

The present invention relates to a Raman amplification method of Raman-amplifying signal light of a plurality of channels which are included in a predetermined wavelength band and have different wavelengths, a Raman amplification pumping unit for supplying pumping light of a plurality of channels having different wavelengths to an optical transmission path through which the signal light of the plurality of channels propagates, and a WDM optical communication system to which the Raman amplification pumping unit is applied.

2. Related Background Art

In a general optical communication system, the signal light sent out from a transmitter will decrease in power by the time it reaches a receiver because of the transmission loss caused when it is transmitted through an optical transmission path. If the power of the signal light having reached the receiver is lower than a predetermined value, optical communication may not be properly performed due to a reception error. For this reason, an optical amplifier is placed on the optical transmission path between the transmitter and the receiver. Signal light is optically amplified by this optical amplifier to compensate for the transmission loss in the signal light on the optical transmission path.

In a WDM (Wavelength Division Multiplexing) optical communication system using multiplexed signal light of a plurality channels which are included in a predetermined wavelength band and have different wavelengths, it is important to flatten the gain spectrum of an optical amplifier in the predetermined wavelength band (signal wavelength band). This is because if the gain spectrum is not flat, although signal light of a given channel of the plurality of channels is properly received by a receiver, signal light of another channel may not be properly received because of a reception error. In Raman amplification, a gain spectrum is flattened by appropriately setting the pumping light powers of a plurality of channels supplied to an optical transmission path, especially the powers of the respective pumping channels (having different wavelengths).

In practice, however, the transmission loss in signal light changes due to the influences of the bending of the optical transmission path, ambient temperature, and the like. For this reason, each pumping light power must be adjusted appropriately in accordance with loss changes in signal light.

For example, according to Japanese Patent Laid-Open No. 10-150414, one of a plurality of amplified signal channels which has the maximum power is selected, and a pumping light power is so adjusted as to set the optical power of the selected signal channel to a predetermined value.

SUMMARY OF THE INVENTION

As a result of examination of the above conventional technique, the following problems are found. In a conventional Raman amplifier, if the bandwidth between a pumping channel having the shortest wavelength and a pumping channel having the longest wavelength among a plurality of pumping channels contained in supplied pumping light is large, an interaction is caused between pumping channels, i.e., a pumping channel on the short wavelength side causes Raman amplification of a pumping channel on the long wavelength side. The occurrence of this interaction between pumping light beams greatly complicates adjustment of optical powers between the pumping channels. This makes it difficult to flatten the gain spectrum in a Raman amplifier.

No consideration has been given to this interaction between pumping channels in the technique disclosed in the above reference. Even if, therefore, the technique disclosed in the reference is applied to a Raman amplifier, a pumping light power is not properly adjusted in accordance with a loss change in signal light, and the gain spectrum of the Raman amplifier is not flattened.

The present invention has been made to solve the above problems, and has as its object to provide a Raman amplification method which can properly adjust a pumping light power in accordance with a loss change in signal light, and easily flatten the gain spectrum, a Raman amplification pumping unit, and a WDM optical communication system to which the Raman amplification pumping unit is applied.

A Raman amplification method according to the present invention is a Raman amplification method of amplifying signal light of a plurality of channels (signal channels) which are included in a predetermined wavelength band and have different wavelengths by supplying pumping light of a plurality of channels (pumping channels) having different wavelengths to an optical transmission path through which the signal light propagates. This Raman amplification method comprises at least the detection step and adjusting step. In the detection step, powers of at least light components having two wavelengths of propagating light containing the amplified signal light are detected. In the adjusting step, an optical power of each of a plurality of pumping channels in the supplied pumping light is adjusted on the basis of a power of at least a light component having one wavelength of the detected light components having the two wavelengths, and a power difference amount between the detected light components having the two wavelengths.

As described above, the powers of at least light components having two different wavelengths, of propagating light containing amplified signal light of a plurality of channels, are detected, and the power difference amount between the light components having the two wavelengths and the power of at least the light component having one wavelength are obtained on the basis of these detection results. This power difference amount and the detected power of the light component change in accordance with a loss change in signal light. The pumping light power of each of the plurality of pumping channels is adjusted on the basis of this power difference amount and optical powers which change in accordance with a loss change in the signal light. Therefore, according to the Raman amplification method, the optical power of each pumping channel can be properly adjusted in accordance with a loss change in signal light, thereby easily flattening the gain spectrum.

In the Raman amplification method according to the present invention, a table in which an appropriate pumping light power is made to correspond to the detected power of a light component and the power difference amount in each of a plurality of pumping channels is prepared. In adjusting the optical power of each pumping channel in pumping light, it is preferable that the optical power of each pumping channel be properly obtained from the detected power of a light component and the detected power difference amount. In this case, the optical power of each pumping channel in pumping light can be easily obtained from the above table.

In the Raman amplification method according to the present invention, it is preferable that in the adjusting step, an amount of loss change which is a difference between a predetermined predicted loss amount and an actual loss amount in propagating light in the optical transmission path be calculated on the basis of the detected power of the light component, a slope of an approximate line representing a correlation between a wavelength and the amount of loss change be calculated on the basis of the detected power difference amount, and the optical power of each of a plurality of pumping channels in the pumping light be adjusted on the basis of the amount of loss change and the slope of the approximate line. In this case as well, the optical power of each pumping channel in pumping light can be properly adjusted in accordance with a loss change in signal light, and the gain spectrum can be easily flattened.

In the Raman amplification method according to the present invention, it is preferable that in the adjusting step, letting A be the amount of loss change, S be the slope of the approximate line, and $a_m$ and $b_m$ be constants for obtaining a change amount of pumping light power of an m-th (m is an arbitrary integer not less than 1 and not more than M) channel when the number of channels of the pumping light is M (M is an integer not less than 2), the pumping light power of the m-th channel be adjusted on the basis of a change amount obtained by $$a_m \times A + b_m \times S$$

In this case, the change amount of pumping light power of each pumping channel can be obtained from a simple expression.

In order to supply pumping light of a plurality of channels (pumping channels) having different wavelengths to an optical transmission path through which signal light of a plurality of channels (signal channels) which are included in a predetermined wavelength band and have different wavelengths propagates, a Raman amplification pumping unit according to the present invention comprises at least a plurality of pumping light sources, a photodetector, and an adjusting section.

The plurality of pumping light sources output light components of the corresponding pumping channels as pumping light. The photodetector detects the powers of at least light components having two wavelengths of propagating light containing amplified signal light of a plurality of channels. The adjusting section adjusts the optical power of each pumping channel in pumping light on the basis of the power of at least a light component having one wavelength of the light components having the two wavelengths detected by the photodetector and the power difference amount between the detected light components having the two wavelengths.

As described above, the powers of at least light components having two wavelengths, of propagating light containing amplified signal light of a plurality of channels, are detected, and the power difference amount between the light components having the two wavelengths and the power of at least the light component having one wavelength are obtained on the basis of these detection results. This power difference amount and optical power change in accordance with a loss change in signal light. The optical power of each pumping channel is adjusted by the adjusting section on the basis of this power difference amount and optical power which change in accordance with a loss change in the signal light. Therefore, according to this Raman amplification pumping unit, the pumping light power of each pumping channel can be properly adjusted in accordance with a loss change in signal light, thereby easily flattening the gain spectrum.

In the Raman amplification pumping unit according to the present invention, the adjusting section has a table in which an appropriate pumping light power is made to correspond to the detected power of the light component and the power difference amount for each of the plurality of pumping channels in the pumping light. It is preferable to obtain an optical power of each pumping channel in the pumping light from the detected power of the light component and the power difference amount by using the table. In this case, the appropriate pumping light power of each pumping channel can be easily obtained from the above table.

In the Raman amplification pumping unit according to the present invention, the adjusting section further comprises first and second calculators. The first calculator calculates an amount of loss change which is a difference between a predetermined predicted loss amount and an actual loss amount in propagating light in the optical transmission path on the basis of the detected power of the light component. The second calculator calculates a slope of an approximate line representing a correlation between a wavelength and the amount of loss change on the basis of the power difference amount. The adjusting section preferably adjusts the pumping light power of each pumping channel on the basis of the amount of loss change and the slope of the approximate line. In this case as well, the pumping light power of each pumping channel can be properly adjusted in accordance with a loss change in signal light, and the gain spectrum can be easily flattened.

In the Raman amplification pumping unit according to the present invention, letting A be the amount of loss change, S be the slope of the approximate line, and $a_m$ and $b_m$ be constants for obtaining a change amount of pumping light power of an m-th (m is an arbitrary integer not less than 1 and not more than M) channel when the number of channels of the pumping light is M (M is an integer not less than 2), the adjusting section preferably adjusts the pumping light power of the m-th channel on the basis of a change amount obtained by $$a_m \times A + b_m \times S$$

In this case, the change amount of pumping light power of each channel can be easily obtained from a simple expression.

A WDM optical communication system according to the present invention comprises at least an optical transmission path and a Raman amplification pumping unit (a Raman amplification pumping unit according to the present invention) having the above structure. Signal light of a plurality of channels which are included in a predetermined wavelength band and have different wavelengths propagates through the optical transmission path. The above Raman amplification pumping unit applied to the WDM optical communication system supplies pumping light of a plurality of channels having different wavelengths to the optical transmission path. According to this WDM optical communication system, by using the Raman amplification pumping unit having the above structure, WDM optical communication is realized with the gain spectrum being properly flattened.

DETAILED DESCRIPTION OF THE PREFERRED EMBODIMENTS

Figure 1:
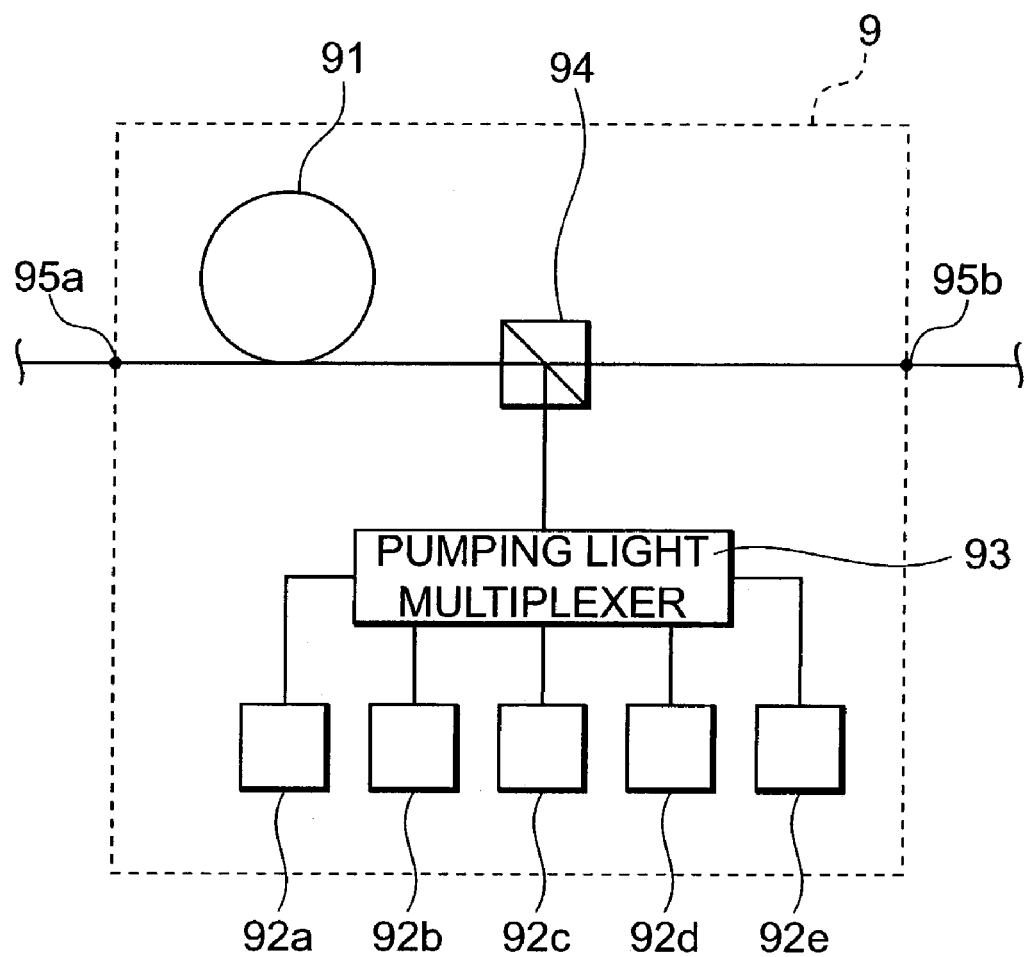
FIG. 1 is a block diagram showing the schematic arrangement of a Raman amplifier.

A Raman amplification method, Raman amplification pumping unit, and WDM optical communication system according to the present invention will be described in detail below with reference to FIGS. 1 to 11. Note that the same reference numerals denote the same parts throughout the drawings, and a repetitive description thereof will be avoided.

Details of how the present invention has been made will be described first. The following description is based on the results obtained by simulation using a simulation model for a Raman amplifier.

FIG. 1 is a view showing the arrangement of the Raman amplifier. This Raman amplifier 9 includes an optical fiber 91 serving as a medium for Raman amplification, a first pumping light source 92a, a second pumping light source 92b, a third pumping light source 92c, a fourth pumping light source 92d, a fifth pumping light source 92e, a pumping light multiplexer 93, and an optical multiplexer 94.

The Raman amplifier 9 Raman-amplifies propagating light as an optical amplification target by backward pumping. In this Raman amplifier 9, the optical fiber 91 and optical multiplexer 94 are sequentially arranged in a connected state from an input terminal 95a to an output terminal 95b. The pumping light multiplexer 93 is connected to the optical multiplexer 94. The five pumping light sources 92a to 92e are connected to the pumping light multiplexer 93.

In the Raman amplifier 9, light components of five pumping channels (included in pumping light) output from the five pumping light sources 92a to 92e are multiplexed by the pumping light multiplexer 93. The multiplexed light (pumping light) is supplied to the optical fiber 91 via the optical multiplexer 94. The propagating light input to the Raman amplifier 9 is Raman-amplified by the optical fiber 91 to which the pumping light is supplied.

In this simulation model, the optical fiber 91 is a silica-based single-mode fiber having a total length of 80 km. Each of the five pumping light sources 92a to 92e is a semiconductor laser diode. The wavelength (the first pumping channel wavelength) of the pumping light output from the first pumping light source 92a is 1,425 nm. The wavelength (the second pumping channel wavelength) of the pumping light output from the second pumping light source 92b is 1,435 nm. The wavelength (the third pumping channel wavelength) of the pumping light output from the third pumping light source 92c is 1,450 nm. The wavelength (the fourth pumping channel wavelength) of the pumping light output from the fourth pumping light source 92d is 1,465 nm. The wavelength (the fifth pumping channel wavelength) of the pumping light output from the fifth pumping light source 92e is 1,492 nm.

The propagating light contains signal light of 38 channels, and has a wavelength band (signal wavelength band) of 1,532 nm to 1,606 nm (central wavelength of 1,569 nm). In this Raman amplifier 9, the pumping light beams of the respective pumping channels respectively output from the five pumping light sources 92a to 92e are set to proper powers such that when the optical power of each signal channel at the input terminal 95a is 8 dBm, the optical power of each signal channel at the output terminal 95b becomes 0 dBm. Note, however, that the pumping light power of each pumping channel is set on the assumption that no loss is caused by the bending of the optical fiber 91.

Figure 2:
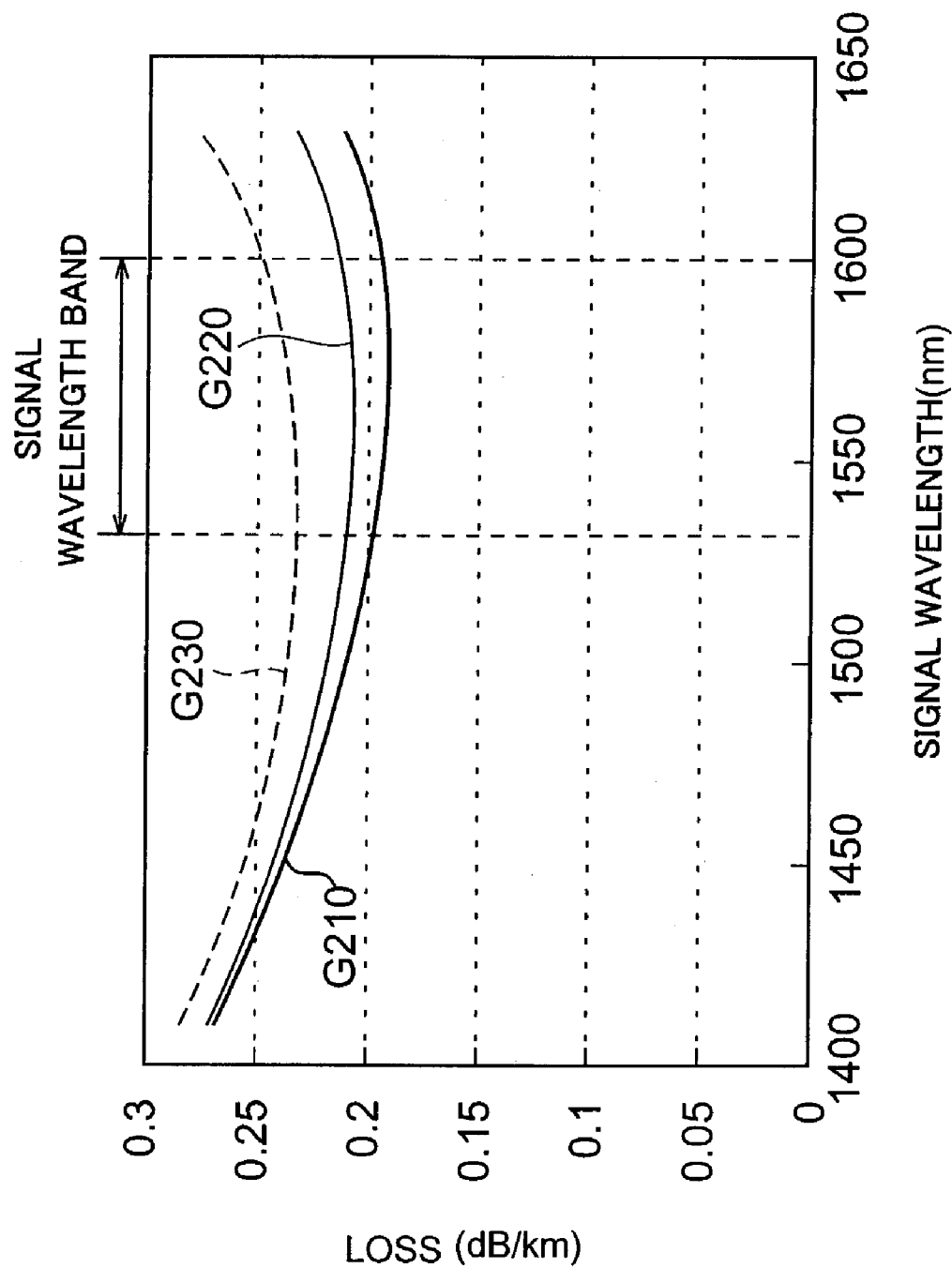
FIG. 2 is a graph showing the loss characteristics of an optical fiber serving as a medium for Raman amplification.

Loss changes in the optical fiber 91 and changes in the powers of output signal light beams due to the loss changes will be described next. FIG. 2 is a graph showing the loss characteristics of the optical fiber 91. Referring to FIG. 2, the abscissa represents the signal wavelength (nm); and the ordinate, the loss (dB/km).

The graph of FIG. 2 shows the result obtained by measurement in a case wherein there is no loss due to the bending of the optical fiber 91 and the result obtained by measurement in a case wherein the loss is increased by the bending of the optical fiber 91. In the absence of the bending of the optical fiber 91, the amount of loss change (loss increase) is 0 dB. Note that a curve G210 represents the loss characteristics of the optical fiber 91 when the amount of loss change at a central wavelength of 1,569 nm is 0 dB. That is, the curve G210 represents the loss characteristics without any bending of the optical fiber 91. A curve G220 represents the loss characteristics of the optical fiber 91 when the amount of loss change at a central wavelength of 1,569 nm is 1 dB. A curve G230 represents the loss characteristics of the optical fiber 91 when the amount of loss change at a central wavelength of 1,569 nm is 3 dB. That is, these curves G220 and G230 represent the loss characteristics of the optical fiber 91 when the loss is increased by bending the optical fiber 91.

Figure 3:
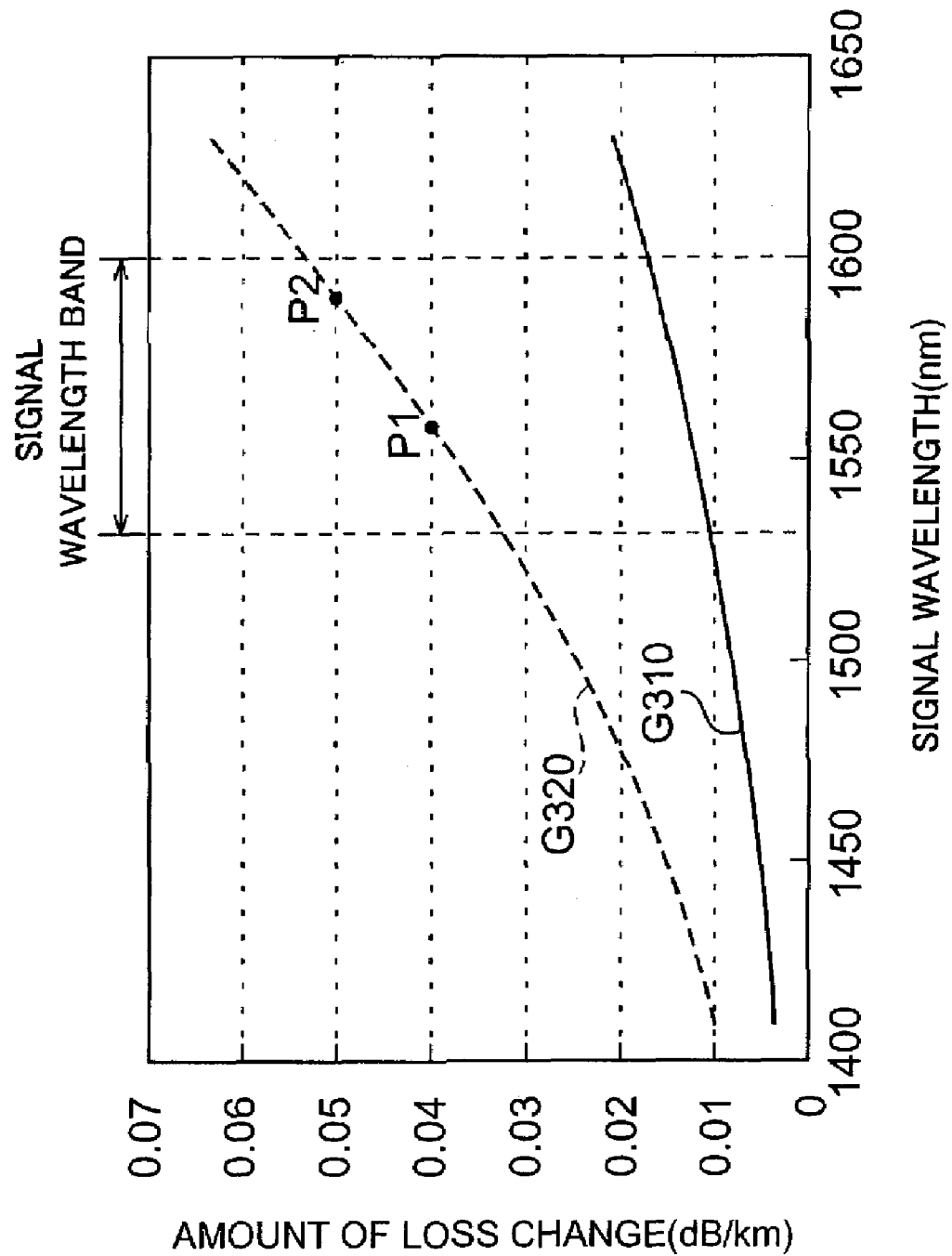
FIG. 3 is a graph showing the amount of loss change at each wavelength in the optical fiber having the loss characteristics shown in FIG. 2.

FIG. 3 is a graph showing the amount of loss change in the optical fiber 91 at each wavelength. Referring to FIG. 3, the abscissa represents the signal light wavelength (nm); and the ordinate, the amount of loss change (dB/km). A curve 310 shows the amount of loss change which is obtained by subtracting the value of loss represented by the curve G210 from the value of loss represented by the curve G220. A curve 320 shows the amount of loss change which is obtained by subtracting the value of loss represented by the curve G210 from the value of loss represented by the curve G230. As is obvious from FIG. 3, the loss on the short wavelength side increases more than that on the long wavelength side. In addition, both these curves G310 and G320 are substantially linear in the signal wavelength band.

Figure 4:
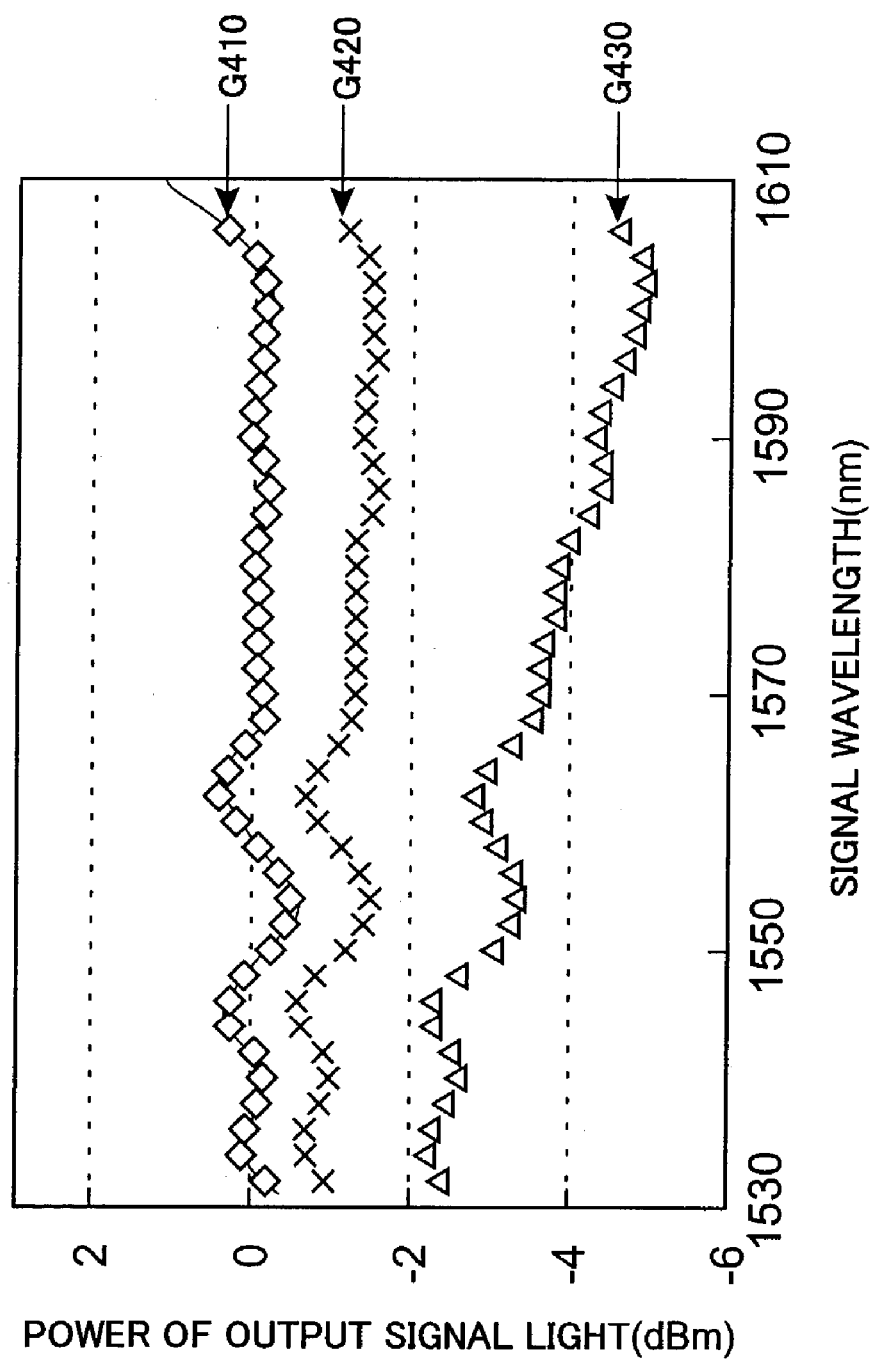
FIG. 4 is a graph showing the powers of output signal light from the Raman amplifier shown in FIG. 1 when the amount of loss change in the optical fiber having the loss characteristics shown in FIG. 2 at a wavelength of 1,569 nm is 0 dB, 1 dB, and 3 dB.

FIG. 4 shows the powers of output signal light beams from the Raman amplifier 9 when the amount of loss change in the optical fiber 91 at a wavelength of 1,569 nm is 0 dB (corresponding to a curve G410 plotted with the symbol "◇"), 1 dB (corresponding to a curve G420 plotted with the symbol "x"), and 3 dB (corresponding to a curve G430 plotted with the symbol "Δ"). Referring to FIG. 4, the abscissa represents the wavelength (nm); and the ordinate, the power of output signal light (dBm).

When the amount of loss change is 0 dB, the optical power of each signal channel at the output terminal 95b is uniformly set to about 0 dBm. In contrast to this, when the amount of loss change is 1 dB and 3 dB, the optical power of each signal channel at the output terminal 95b does not reach a target power. When the amount of loss change is 3 dB, the flatness of the gain spectrum deteriorates.

The reason why the power of signal light at the output terminal 95b does not reach the target power when the amount of loss change is 1 dB and 3 dB may be that although the loss in the optical fiber 91 has increased, the amplification factor of the Raman amplifier 9 has not changed, and each signal channel is not Raman-amplified to the target power. The reason why the flatness of the gain spectrum deteriorates when the amount of loss change is 3 dB is that the loss on the long wavelength side is larger than that on the short wavelength side, as shown in FIG. 3.

Figure 5:
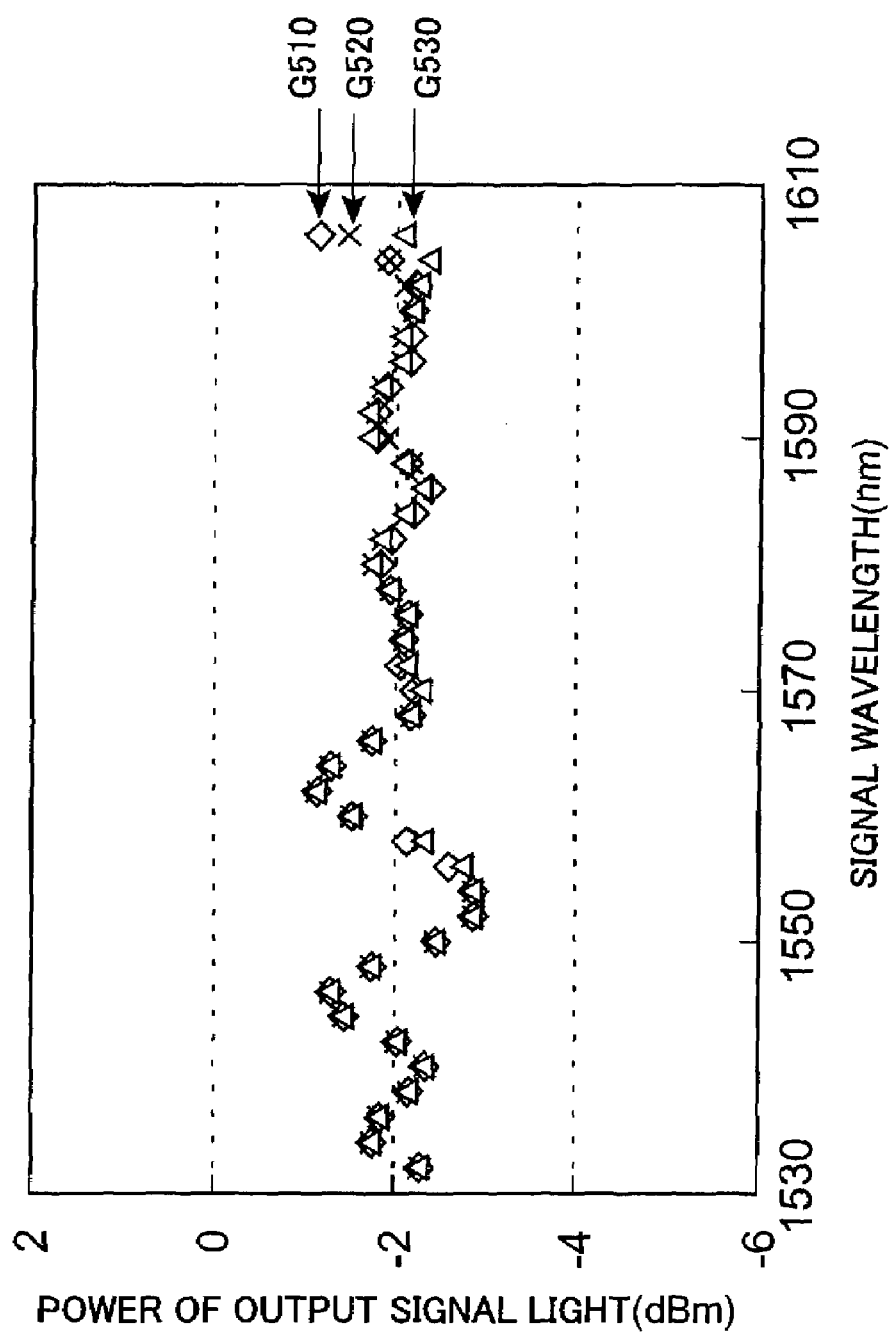
FIG. 5 is a graph showing the power of output signal light when the power of pumping light output from each of five pumping light sources shown in FIG. 1 is properly adjusted in accordance with a loss change.

A proper pumping light power corresponding to a loss change and a relational expression for obtaining the pumping light power will be described next. FIG. 5 shows the powers of output signal light beams in a case wherein the pumping light powers of pumping channels output from the five pumping light sources 92a to 92e are properly adjusted in accordance with loss changes. Referring to FIG. 5, the abscissa represents the signal light wavelength (nm); and the ordinate, the power of output signal light (dBm). Referring to FIG. 5, the powers of the respective signal channels are uniformly set to about 0 dBm in all cases wherein the amount of loss change at a wavelength of 1,569 is 0 dB (a curve G510 plotted with the symbol "◇"), 1 dB (a curve G520 plotted with the symbol "x"), and 3 dB (a curve G530 plotted with the symbol "Δ").

Figure 6:
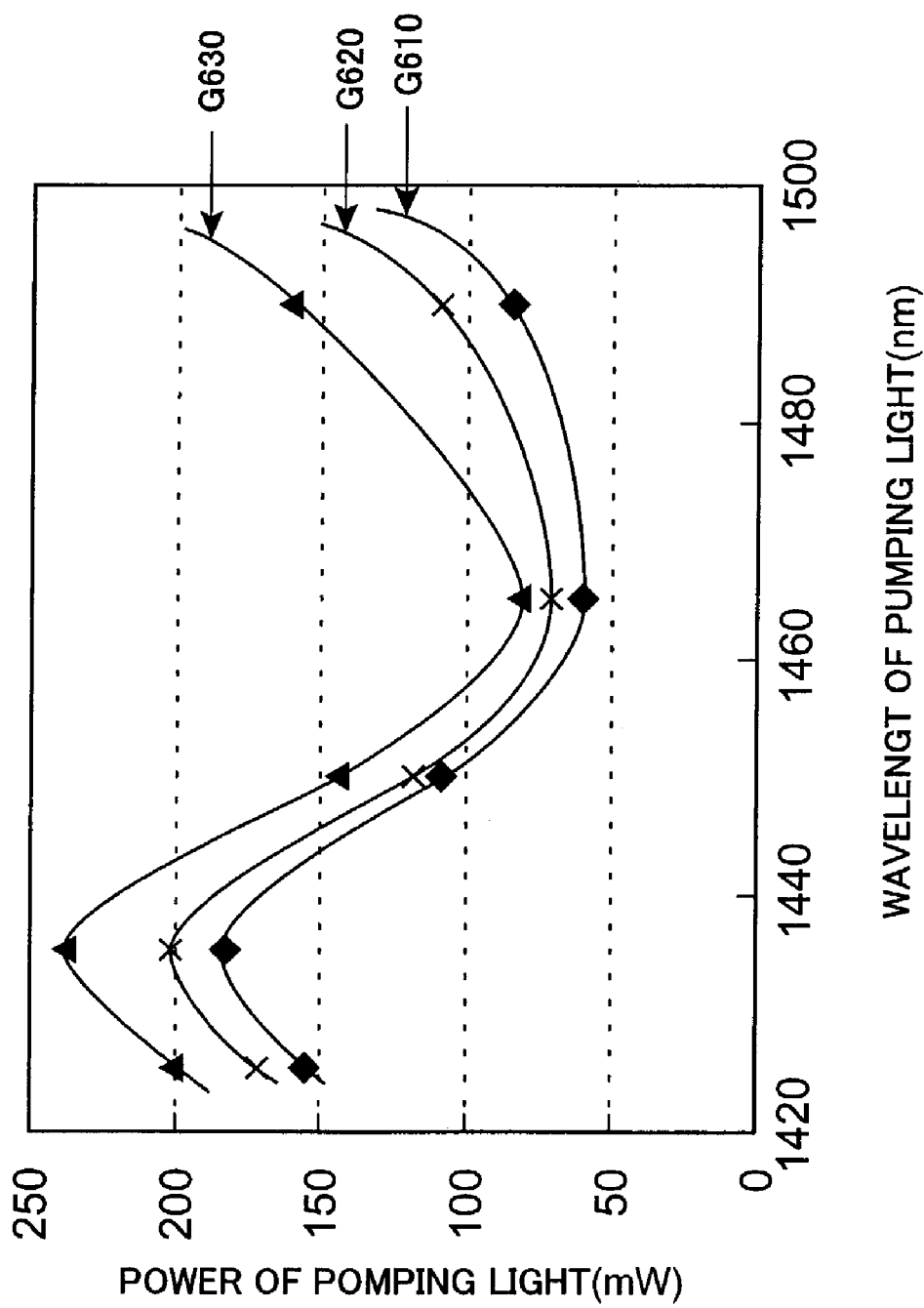
FIG. 6 is a graph showing the power of each pumping channel when the power of pumping light output from each of the five pumping light sources shown in FIG. 1 is properly adjusted in accordance with a loss change.

In order to adjust the power of output signal light in accordance with the loss change in this manner, the pumping light of each pumping channel must be supplied to the optical fiber 91 by the pumping light power shown in FIG. 6.

FIG. 6 shows the pumping light power of each pumping channel in a case wherein the pumping light power is properly adjusted in accordance with a loss change in signal light. Referring to FIG. 6, the abscissa represents the pumping light wavelength (nm); and the ordinate, the pumping light power of each pumping channel (mW). Referring to FIG. 6, a curve G610 represents the pumping light powers of the respective pumping channels (five channels) by which the loss change in signal light becomes 0 dB, the pumping light powers of the respective pumping channels (five channels) by which the loss change in signal light becomes 1 dB, and the pumping light powers of the respective pumping channels (five channels) by which the loss change in signal light becomes 3 dB. By supplying the respective pumping light beams to the optical fiber 91 using the pumping light powers shown in FIG. 6, the powers of signal light beams of 38 channels at the time of output are uniformly set to about 0 dBm (the gain spectrum is almost flattened).

A proper pumping light power corresponding to the loss change shown in FIG. 6 can be calculated from the amount of loss change and the slope of an approximate line. Note that the approximate line represents the correlation between the wavelength and the amount of loss change. Assume that the amount of loss change at a wavelength of 1,569 nm is 3 dB. In this case, letting P1 be a point representing the amount of loss change at a given wavelength in FIG. 3, and P2 be a point representing the amount of loss change at another wavelength, a line (P1–P2) which connects these points P1 and P2 (P1–P2) is the approximate line and substantially linear, and hence the interval from the point P1 to the point P2 on the curve G320 is approximated.

The slope of a approximate line, e.g., the line (P1–P2), is obtained by $$\text{(slope of line } (P1\text{--}P2))=(\delta L_{P1}-\delta L_{P2})/(\lambda_{P1}-\lambda_{P2}) \quad (1)$$

where $\delta L_{P1}$ is the amount of loss change indicated by the point P1 in FIG. 3, $\delta L_{P2}$ is the amount of loss change indicated by the point P2 in FIG. 3, $\lambda_{P1}$ is the wavelength indicated by the point P1 in FIG. 3, and $\lambda_{P2}$ is the wavelength indicated by the point P2 in FIG. 3. Letting $P_{P1}$ be the power of a light component having a wavelength $\lambda_{P1}$ after Raman amplification, and $P_{P2}$ be the power of a light component having a wavelength $\lambda_{P2}$ after Raman amplification, the slope of the line (P1–P2) is given by $$\text{(slope of line } (P1\text{--}P2))=(P_{P1}-P_{P2})/(\lambda_{P1}-\lambda_{P2}) \quad (2)$$

In equation (2) above, the right side numerator ($P_{P1}-P_{P2}$) in equation (2) is the power difference amount between light components with two wavelengths.

Figure 7:
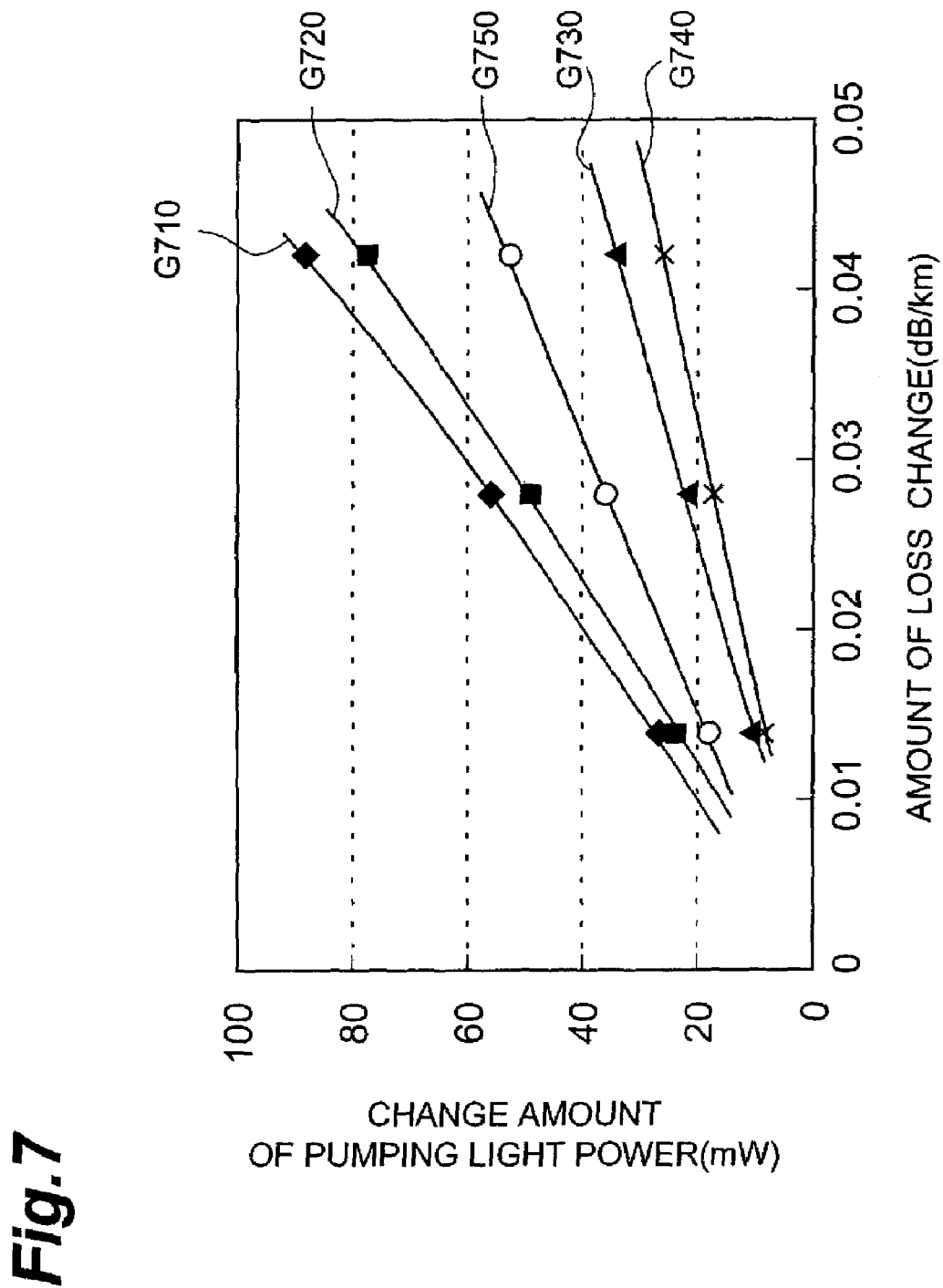
FIG. 7 is a graph showing the relationship between the amount of loss change and the change amount of pumping light power.
Figure 8:
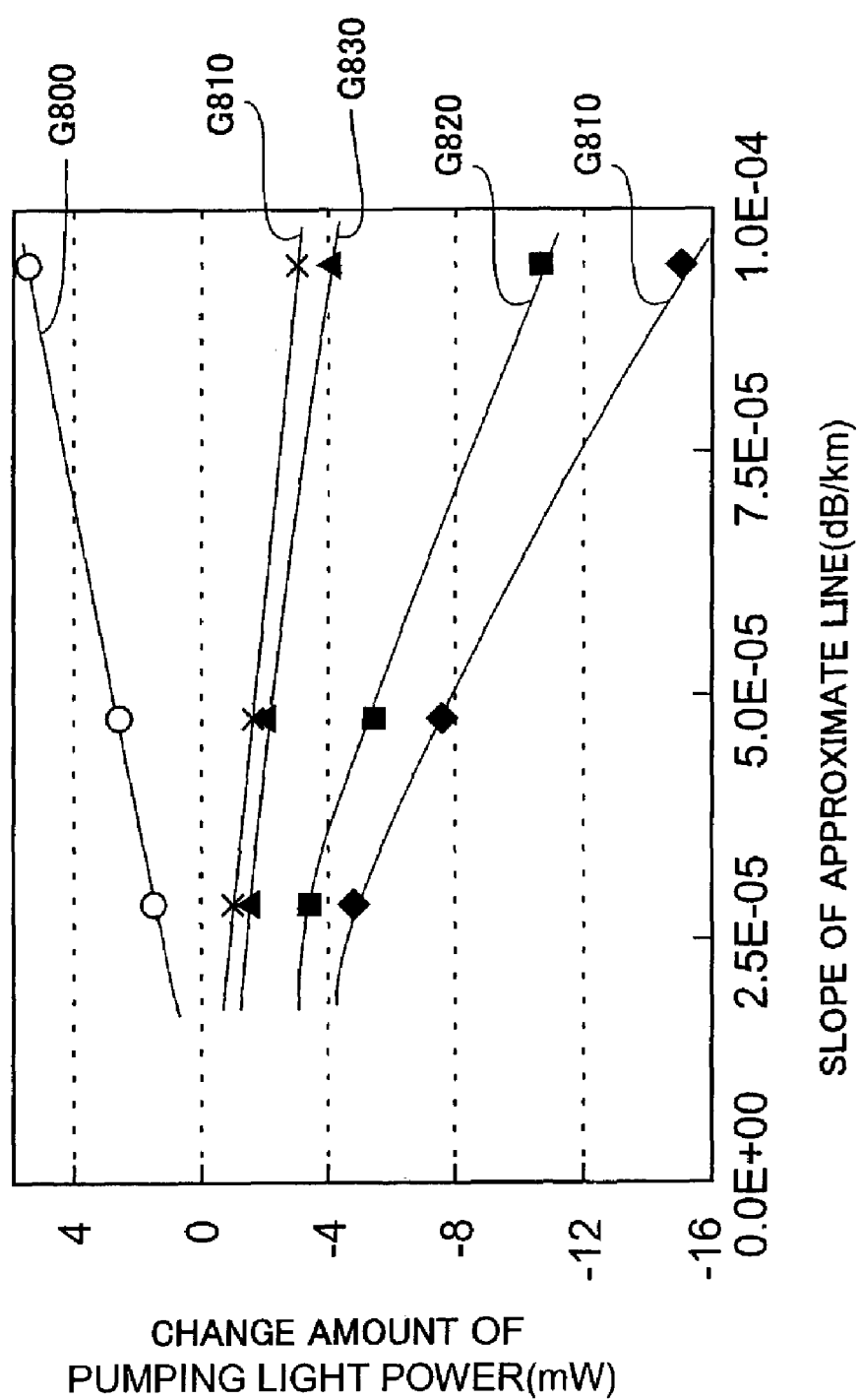
FIG. 8 is a graph showing the relationship between the slope of an approximate line and the change amount of pumping light power.

FIGS. 7 and 8 show the results obtained by calculating the change amounts of pumping light powers shown in FIG. 6 by using these amounts of loss changes and the slopes of approximate lines as variables.

FIG. 7 is a graph showing the relationship between the amount of loss change and the change amount of pumping light power. FIG. 8 is a graph showing the relationship between the slope of an approximate line and the change amount of pumping light power. Referring to FIG. 7, the abscissa represents the amount of loss change (dB/km); and the ordinate, the change amount of pumping light power (mW). Referring to FIG. 8, the abscissa represents the slope of an approximate line (dB/(km·nm)); and the ordinate, the change amount of pumping light power (mW).

Referring to FIG. 7, a curve G710 indicates the amount of loss change and the change amount of pumping light power when the pumping channel wavelength is 1,425 nm; a curve G720 indicates the same when the pumping channel wavelength is 1,435 nm; a curve G730 indicates the same when the pumping channel wavelength is 1,450 nm; a curve G740 indicates the same when the pumping channel wavelength is 1,465 nm; and a curve G750 indicates the same when the pumping channel wavelength is 1,492 nm. Referring to FIG. 8, a curve G710 indicates the slope of an approximate line and the change amount of pumping light power when the pumping channel wavelength is 1,425 nm; a curve G720 indicates the same when the pumping channel wavelength is 1,435 nm; a curve G730 indicates the same when the pumping channel wavelength is 1,450 nm; a curve G740 indicates the same when the pumping channel wavelength is 1,465 nm; and a curve G750 indicates the same when the pumping channel wavelength is 1,492 nm.

FIG. 7 shows the change amounts of pumping light powers of the respective pumping channels output from the five pumping light sources 92a to 92e with respect to the amounts of loss changes at predetermined wavelengths. Likewise, FIG. 8 shows the change amounts of pumping light powers of the respective pumping channels output from the five pumping light sources 92a to 92e with respect to the slopes of approximate lines obtained from the amounts of loss changes at two predetermined wavelengths.

As shown in FIG. 7, the change amounts of pumping light powers of the respective pumping channels output from the five pumping light sources 92a to 92e are proportional to the amounts of loss changes. As shown in FIG. 8, the change amounts of pumping light powers of the respective pumping channels output from the five pumping light sources 92a to 92e are proportional to the slopes of the approximate lines.

According to the above proportionalities, the change amount of pumping light power of the m-th pumping channel is approximated by (change amount of pumping light power of m-th pumping channel)=$a_m \times A + b_m \times S$     (3)

where A is the amount of loss change, S is the slope of the approximate line, and $a_m$ and $b_m$ are constants used to obtain the change amount of pumping light power of the m-th (m is an arbitrary integer equal to or more than 1) channel when the number of pumping light channels is M (M is an integer equal to or more than 2).

In addition, $a_m \times A$ is the term derived from the proportionality between the amount of loss change and the change amount of pumping light power of each pumping channel shown in FIG. 7, and $b_m \times S$ is the term derived from the proportionality between the slope of an approximate line and the change amount of pumping light power of each pumping channel shown in FIG. 8.

In equation (3), the number of pumping light channels is not limited to five but may be arbitrarily set. Assume that the number of pumping light channels is generally M. In this case, if M constants $a_m$ and M constants $b_m$ are obtained in advance, the change amount of pumping light power of each pumping channel can be calculated by equation (3). By using equation (3), the pumping light power of each pumping channel can be properly adjusted in accordance with the loss change in signal light.

The present invention has been made on the basis of the above consideration. Each embodiment of a Raman amplification unit and WDM optical communication system according to the present invention will be described in detail below with reference to FIGS. 9 to 11.

Figure 9:
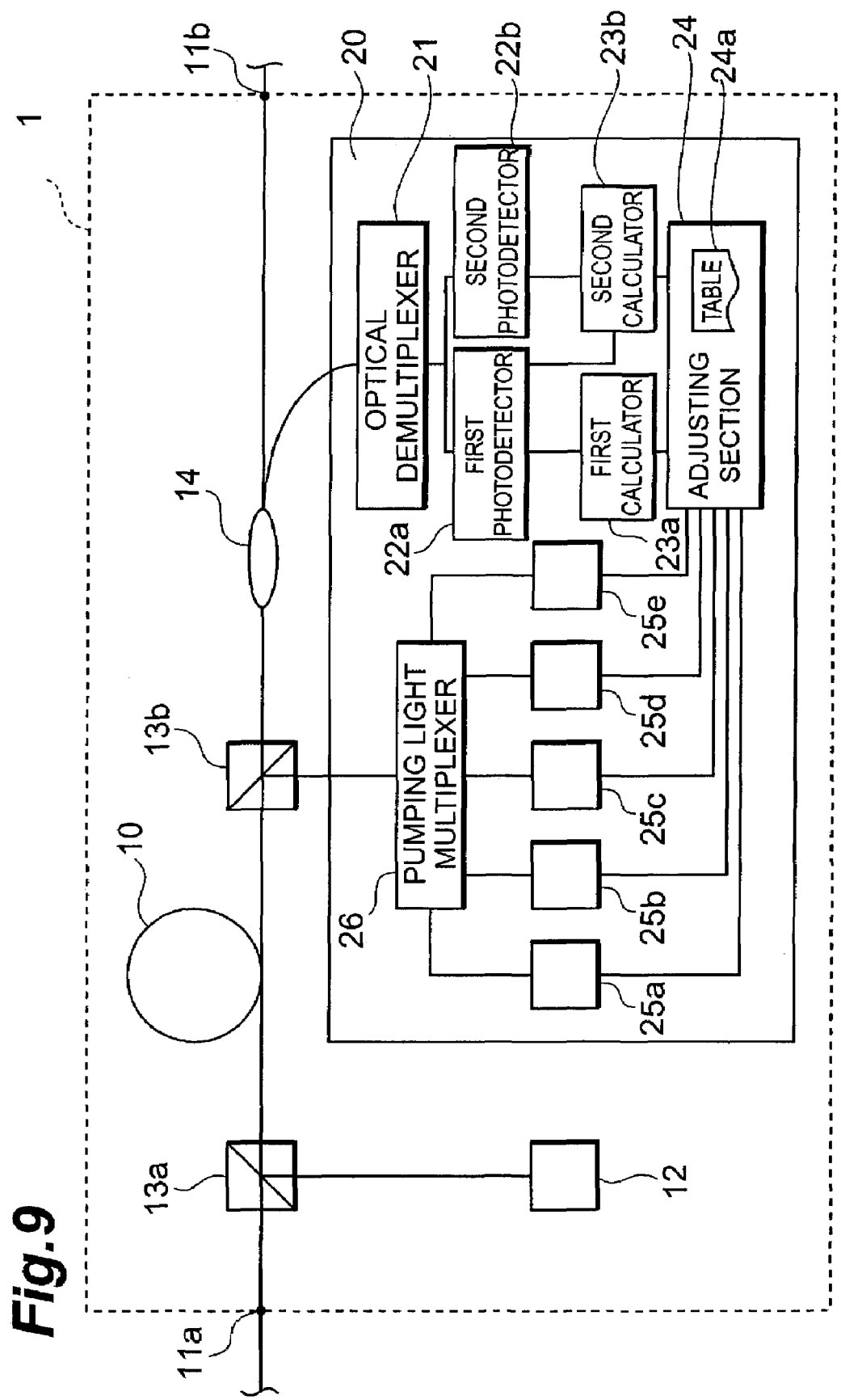
FIG. 9 is a block diagram showing the arrangement of a Raman amplifier including a Raman amplification pumping unit according to the present invention.

FIG. 9 is a view showing the arrangement of a Raman amplifier 1 including a Raman amplification pumping unit 20 according to the present invention. The Raman amplifier 1 includes an optical fiber 10, a monitor light source 12, a first optical multiplexer 13a, a second optical multiplexer 13b, and an optical branching device 14, in addition to the Raman amplification pumping unit 20.

The optical fiber 10 is an optical transmission path through which propagating light containing signal light (multiplexed signal light) of a plurality of channels (signal channels) which are included in a predetermined wavelength band and have different wavelengths propagates from an input terminal 11a to an output terminal 11b. The monitor light source 12 is connected to the first optical multiplexer 13a to output signal light of a plurality of channels and monitor light of wavelengths different from those of the signal channels to the first optical multiplexer 13a.

The first optical multiplexer 13a is placed between the optical fiber 10 and the input terminal 11a. The first optical multiplexer 13a lets the signal light of the plurality of channels input from the input terminal 11a pass through to the optical fiber 10. The first optical multiplexer 13a also receives the monitor light output from the monitor light source 12 and outputs it to the optical fiber 10.

The Raman amplification pumping unit 20 outputs pumping light and receives part of the propagating light containing the signal light of the plurality of channels and the monitor light. The Raman amplification pumping unit 20 is connected to the second optical multiplexer 13b and optical branching device 14.

The second optical multiplexer 13b is placed between the optical fiber 10 and the output terminal 11b. The second optical multiplexer 13b causes the propagating light containing the signal light of the plurality of channels having passed through the optical fiber 10 to pass through to the output terminal 11b. The second optical multiplexer 13b also receives the pumping light output from the Raman amplification pumping unit 20 and outputs it to the optical fiber 10.

The optical branching device 14 is placed between the second optical multiplexer 13b and the output terminal 11b. The optical branching device 14 causes most of the propagating light containing the signal light of the plurality of channels having passed through the second optical multiplexer 13b to pass through to the output terminal 11b, and also branches part of the propagating light to the Raman amplification pumping unit 20.

The Raman amplification pumping unit 20 includes an optical demultiplexer 21, first photodetector 22a, second photodetector 22b, first calculator 23a, second calculator 23b, adjusting section 24, first pumping light source 25a, second pumping light source 25b, third pumping light source 25c, fourth pumping light source 25d, fifth pumping light source 25e, and pumping light multiplexer 26. These five pumping light sources 25a to 25e are semiconductor laser diodes.

The optical demultiplexer 21 is connected to the optical branching device 14 to demultiplex light components, of input propagating light, which has two predetermined wavelengths. The optical demultiplexer 21 is connected to the first and second photodetectors 22a and 22b to output one of the demultiplexed light components having two wavelengths which has one wavelength to the first photodetector 22a, and outputs the light component having the remaining wavelength to the second photodetector 22b. In this case, as the optical demultiplexer 21, for example, a combination of a fiber black grating and an optical circulator or a dielectric filter can be used.

The first photodetector 22a receives one of the demultiplexed light components having two wavelengths and detects its optical power. The first photodetector 22a is connected to both the first calculator 23a and the second calculator 23b and outputs the optical power detected by itself as a first electrical signal to the first and second calculators 23a and 23b.

The second photodetector 22b receives the light component, of the demultiplexed light components having two wavelengths, which has the remaining wavelength, and detects its optical power. The second photodetector 22b is connected to the second calculator 23b and outputs the optical power detected by itself as a second electrical signal to the second calculator 23b.

The first calculator 23a receives the first electrical signal output from the first photodetector 22a. The first calculator 23a stores a target optical power after Raman amplification of the light component detected by the first photodetector 22a. The first calculator 23a calculates the amount of loss in light which is the difference between a predetermined predicted amount of loss in light and the actual amount of loss in the light in the optical fiber 10 on the basis of the stored target optical power and the first electrical signal. The first calculator 23a calculates the amount of loss change on the basis of the power of the light component having one wavelength and the stored target optical power value. The first calculator 23a is connected to the adjusting section 24 to output the data of the calculated amount of loss change to the adjusting section 24.

The second calculator 23b receives the first electrical signal output from the first photodetector 22a and the second electrical signal output from the second photodetector 22b. The first calculator 23a stores in advance the wavelength of the light component detected by the first photodetector 22a and the wavelength of the light component detected by the second photodetector 22b.

The second calculator 23b calculates the slope of an approximate line representing the correlation between the wavelength and the amount of loss change on the basis of the wavelengths of the light components detected by the first and second photodetectors 22a and 22b and the input first and second electrical signals. In this case, the second calculator 23b uses equation (2) above. More specifically, the second calculator 23b calculates the slope of an approximate line on the basis of the wavelengths of light components respectively detected by the first and second photodetectors 22a and 22b and the power difference amount between the light components having two wavelengths. The slope of the approximate line may be obtained according to equation (1). This second calculator 23b is connected to the adjusting section 24 to output the data of the calculated slope of the approximate line to the adjusting section 24.

The adjusting section 24 receives the data of the amount of loss change calculated by the first calculator 23a and the data of the slope of the approximate light calculated by the second calculator 23b. The adjusting section 24 is connected to each of the five pumping light sources 25a to 25e to control the current supplied to each of the five pumping light sources 25a to 25e. The adjusting section 24 stores the relational expression (equation (3)) having the amount of loss change and the slope of an approximate line as variables and constants $a_1$ to $a_5$ and $b_1$ to $b_5$ for obtaining the change amounts of pumping light powers of the five pumping channels output from the five pumping light sources 25a to 25e.

Figure 10:
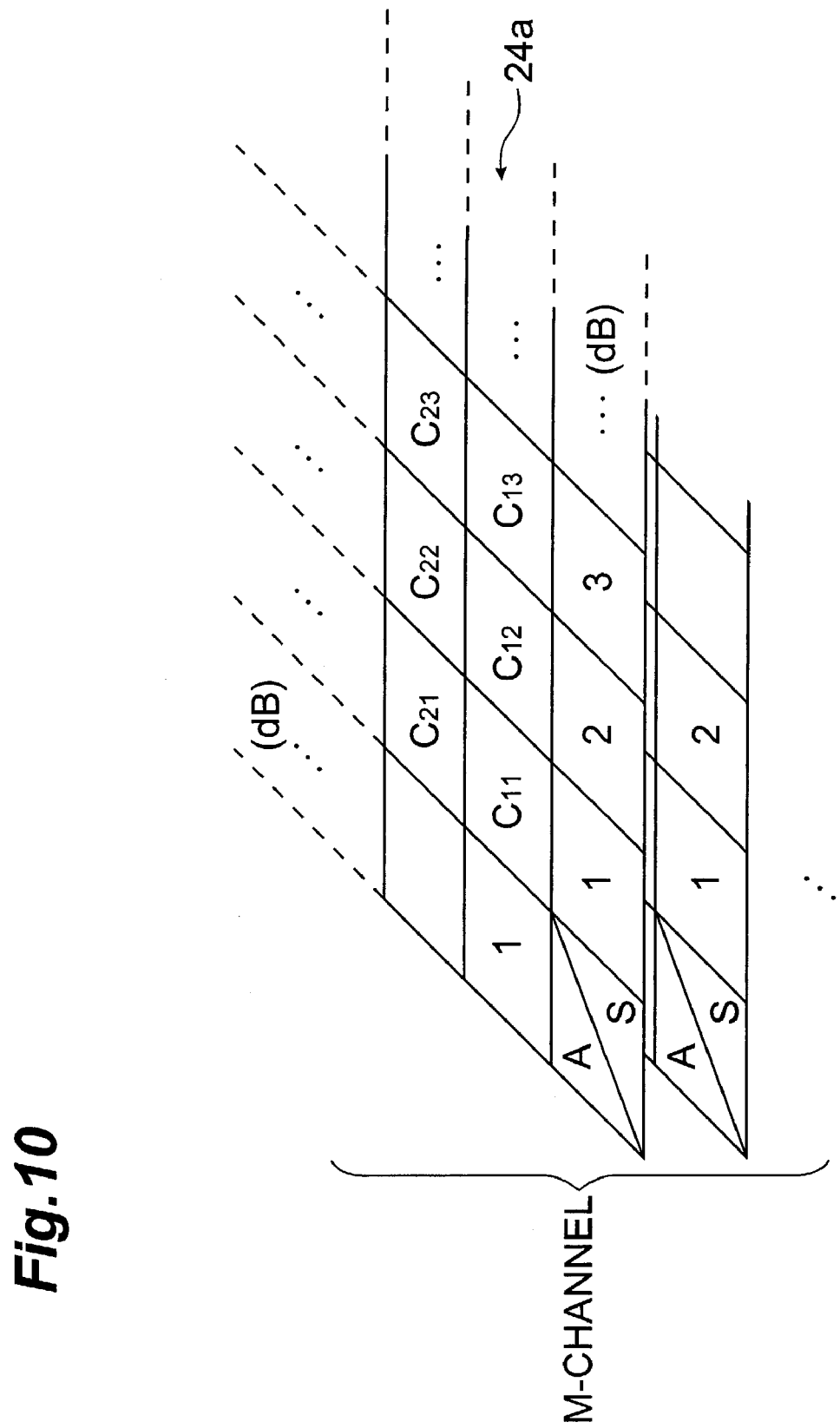
FIG. 10 is a view showing a table prepared in an adjusting section in FIG. 9.

The adjusting section 24 obtains the change amount of pumping light power of each of the five pumping channels by substituting the amount of loss change and the slope of an approximate line into equation (3). In addition, the adjusting section 24 adjusts the power of each of pumping light beams of five wavelengths by controlling the current supplied to each of the five pumping light sources 25a to 25e on the basis of the change amount of pumping light power of each of the five pumping channels which is obtained by stored equation (3). In addition to the above constants, the adjusting section 24 may have a table 24a in which a proper pumping light power ($C_{11}$, $C_{12}$, . . . , $C_{1n}$; $C_{21}$, $C_{22}$, . . . , $C_{2n}$; . . . ; $C_{n1}$, . . . , $C_{nn}$) is made to correspond to a power A of a detected light component and the above power difference amount S in each of the M pumping channels, as shown in FIG. 10. With this arrangement, in adjusting the optical power of each pumping channel in pumping light, the adjusting section 24 can easily obtain the optical power of each pumping channel by using the table 24a.

Each of the five pumping light sources 25a to 25e outputs pumping light having a preset wavelength to the pumping light multiplexer 26 with the power adjusted by the adjusting section 24.

The pumping light multiplexer 26 receives the pumping light beams of the respective pumping channels output from the five pumping light sources 25a to 25e and multiplexes the input pumping light beams of the five channels. The pumping light multiplexer 26 is connected to the second optical multiplexer 13b to output the multiplexed pumping light to the second optical multiplexer 13b.

The operation of the Raman amplifier 1 (Raman amplification method) including the Raman amplification pumping unit 20 will be described next.

The pumping light beams of the five channels output from the five pumping light sources 25a to 25e are multiplexed by the pumping light multiplexer 26, and the multiplexed pumping light is supplied to the optical fiber 10 via the second optical multiplexer 13b.

The signal light of a plurality of channels input to the Raman amplifier 1 is multiplexed with the monitor light output from the monitor light source 12 by the first optical multiplexer 13a. Propagating light containing the signal light of the plurality of channels and monitor light is input to the optical fiber 10. The propagating light is then Raman-amplified in the optical fiber 10 to which the pumping light is supplied.

The Raman-amplified propagating light passes through the second optical multiplexer 13b, and most of the propagating light having passed through the second optical multiplexer 13b passes through the optical branching device 14. Part of the propagating light having passed through the second optical multiplexer 13b is branched by the optical branching device 14. Part of the branched propagating light is input to the optical demultiplexer 21. Of the input light, light components having two predetermined wavelengths are then demultiplexed. One of the light components having the two wavelengths demultiplexed by the optical demultiplexer 21 is output to the first photodetector 22a, whereas the light component having the remaining wavelength is output to the second photodetector 22b.

Of the demultiplexed light components having the two wavelengths, the optical power of the light component having one wavelength is detected by the first photodetector 22a. The optical power detected by the first photodetector 22a is output as a first electrical signal to the first and second calculators 23a and 23b.

Of the demultiplexed light components having the two wavelengths, the optical power of the light component having the remaining wavelength is detected by the second photodetector 22b. The optical power detected by the second photodetector 22b is output as a second electrical signal to the second calculator 23b.

The amount of loss change which is the difference between the predetermined predicted amount of loss in light and the actual amount of loss in the light in the optical fiber 10 is calculated by the first calculator 23a. The slope of an approximate line representing the correlation between the wavelength and the amount of loss change is calculated by the second calculator 23b.

The data of the amount of loss change calculated by the first calculator 23a and the data of the slope of the approximate line calculated by the second calculator 23b are input to the adjusting section 24. The change amount of pumping light power of each of the five pumping channels is obtained by substituting the input data of the amount of loss change and the data of the slope of the approximate line into equation (3) stored in the adjusting section 24. Thereafter, the current supplied to each of the five pumping light sources 25a to 25e is controlled on the basis of the change amount of pumping light power of each of the five pumping channels obtained by the adjusting section 24.

When this current is controlled, the power of pumping light output from each of the five pumping light sources 25a to 25e is adjusted. Light of each pumping channel which has the adjusted optical power is output from a corresponding one of the pumping light sources 25a to 25e. The respective light beams are then multiplexed by the pumping light multiplexer 26. The multiplexed pumping light is supplied to the optical fiber 10 via the second optical multiplexer 13b.

In this manner, in the Raman amplifier 1 including the Raman amplification pumping unit 20, the amount of loss change is calculated by the first calculator 23a on the basis of the power of a light component having one wavelength, the slope of an approximate line is calculated by the second calculator 23b on the basis of the power difference amount between light components having two wavelengths, and the power of pumping light of each of the five pumping channels is adjusted on the basis of the amount of loss change and the slope of the approximate line. That is, the power of pumping light of each of the five pumping channels is adjusted on the basis of the power of the light component having one wavelength and the power difference amount between the light components having the two wavelengths.

As described above, according to the Raman amplification pumping unit 20 and Raman amplification method according to the present invention, the powers of at least light components having two wavelengths, of Raman-amplified propagating light containing the signal light of the plurality of channels, are detected, and at least the power difference amount between the light components having the two wavelengths and at least the power of the light component having one wavelength are obtained. This power difference amount and optical power change in accordance with a loss change in signal light. The optical power of each pumping channel is adjusted on the basis of the optical power and power difference amount which change in accordance with a loss change in the signal light. Therefore, the optical power of each pumping channel can be properly adjusted in accordance with a loss change in signal light, thereby easily flattening the gain spectrum.

The Raman amplification pumping unit 20 having the above structure (the Raman amplification pumping unit according to the present invention) can be applied to a WDM optical communication system. An embodiment of the WDM optical communication system according to the present invention will be described next.

Figure 11:
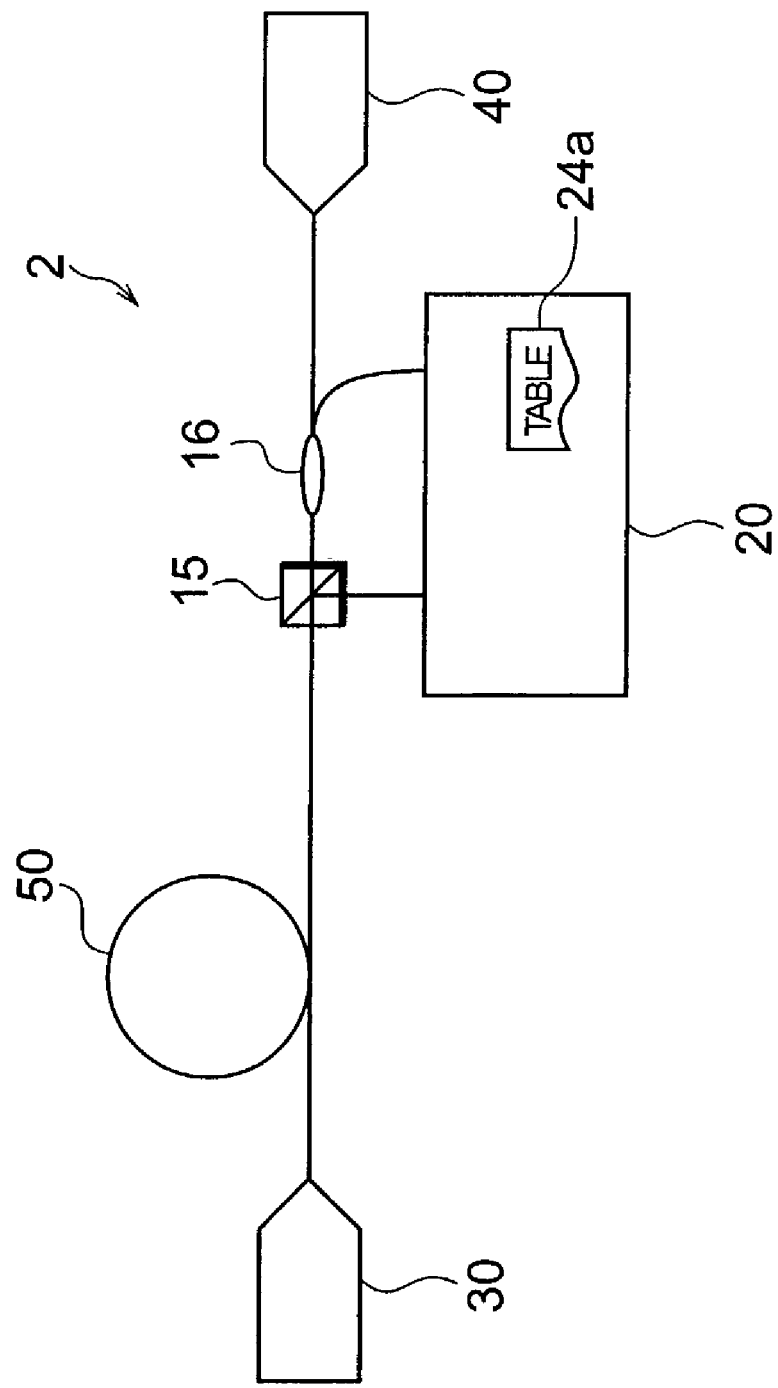
FIG. 11 is a view showing the arrangement of a WDM optical communication system to which the Raman amplification pumping unit shown in FIG. 9 is applied.

FIG. 11 is a view showing the arrangement of a WDM optical communication system 2 to which the Raman amplification pumping unit 20 shown in FIG. 9 is applied. The WDM optical communication system 2 includes an optical multiplexer 15, an optical branching device 16, a transmitting station 30, a receiving station 40, and an optical transmission path 50 in addition to the Raman amplification pumping unit 20. The optical multiplexer 15 has the same structure as that of the second optical multiplexer 13b shown in FIG. 9. The optical branching device 16 has the same structure as that of the optical branching device 14 shown in FIG. 9.

The transmitting station 30 is connected to one end of the optical transmission path 50 and sends out, to the optical transmission path 50, signal light (multiplexed signal light) of a plurality of channels which are included in a predetermined wavelength band and have different wavelengths. The other end of the optical transmission path 50 is connected to the receiving station 40. Signal light propagates from the transmitting station 30 to the receiving station 40. The receiving station 40 receives the signal light propagating through the optical transmission path 50. Pumping light of five pumping channels is supplied from the Raman amplification pumping unit 20 having the above structure (the Raman amplification pumping unit according to the present invention) to the optical transmission path 50 between the transmitting station 30 and the receiving station 40.

In the WDM optical communication system 2, multiplexed signal light of a plurality of channels is sent out from the transmitting station 30 to the optical transmission path 50. The signal light sent out to the optical transmission path 50 is Raman-amplified by the pumping light of the five pumping channels supplied from the Raman amplification pumping unit 20 when propagating through the optical transmission path 50. Thereafter, the Raman-amplified signal light reaches the receiving station 40.

As described above, according to the WDM optical communication system 2 of the present invention, the gain spectrum is properly flattened by the Raman amplification pumping unit 20.

The above embodiment has exemplified the arrangement for calculating the amount of loss change and the slope of an approximate line and adjusting the power of pumping light of each of the five pumping channels. However, the present invention is not limited to this. A table in which the power of a light component having one wavelength and the power difference amount between light components having two wavelengths are made to correspond to an appropriate pumping light power may be prepared, and the power of pumping light of each pumping channel may be obtained from the detected optical power of a light component and a detected power difference amount in adjusting the power of pumping light (see FIG. 10). In this case, for example, the adjusting section 24 stores the table 24a and obtains the power of pumping light of each pumping channel.

In the above embodiment, the powers of light components having two wavelengths are detected, and the power of a light component having one wavelength and the power difference amount between the light components having the two wavelengths are obtained. However, the present invention is not limited to this. The powers of light components having three different wavelengths may be detected, and the power of a light component having one of the three different wavelengths and the power difference amount between the light components having the two remaining wavelengths may be obtained. Alternatively, the powers of light components having four or more different wavelengths may be detected to obtain the powers of light components and a power difference amount, as needed. Furthermore, if the bandwidth between a signal channel having the shortest wavelength, among a plurality of signal channels, and a signal channel having the longest wavelength is large, the signal channels may be formed into two groups (or more), i.e., a long wavelength group and a short wavelength group, and optical powers and power difference amounts may be obtained in the respective groups.

In the above embodiments, propagating light contains signal light of a plurality of channels and monitor light. However, the present invention is not limited to this. Propagating light may not contain monitor light.

The above embodiments may include a plurality of monitor light sources 12. In this case, the power of light having a specific wavelength and a power difference amount can be obtained by using monitor light of a plurality of channels.

In addition, the Raman amplification pumping unit 20 according to the present invention can be applied to both a distributed constant type Raman amplifier and a centered constant type Raman amplifier. In this case, the Raman amplification pumping unit 20 can be applied more effectively to the distributed constant type Raman amplifier than to the centered constant type Raman amplifier because a loss change easily occurs in signal light in a Raman amplification line. This applies to the Raman amplification method according to the present invention. That is, the Raman amplification method can be applied more effectively to the distributed constant type Raman amplifier than to the centered constant type Raman amplifier.

As has been described above, according to the present invention, the power of pumping light of each of a plurality of pumping channels can be properly adjusted in accordance with a loss change in signal light, and the gain spectrum can be easily flattened.

What is claimed is:

1. A Raman amplification method of amplifying signal light of a plurality of channels which are included in a predetermined wavelength band and which have different wavelengths by supplying pumping light of a plurality of channels having different wavelengths to an optical transmission path through which the signal light propagates, comprising:
    a detection step of detecting powers of at least light components having two wavelengths of propagating light containing the amplified signal light; and
    an adjusting step of adjusting an optical power of each of a plurality of pumping channels in the pumping light so as to make an optical power of the amplified signal light constant in the predetermined wavelength band, on the basis of both a power of at least a light component having one wavelength of the detected light components having the two wavelengths and a power difference amount between the detected light components having the two wavelengths.

2. A method according to claim 1, wherein said adjusting step comprises the steps of:
    preparing a table in which an appropriate pumping light power is made to correspond to the detected power of the light component and the power difference amount for each of the plurality of pumping channels; and
    obtaining an optical power of each pumping channel in the pumping light from the detected power of the light component and the power difference amount by using the table.

3. A method according to claim 1, wherein said adjusting step comprises the steps of:
    calculating an amount of loss change which is a difference between a predetermined predicted loss amount and an actual loss amount in propagating light in the optical transmission path on the basis of the detected power of the light component;
    calculating a slope of an approximate line representing a correlation between a wavelength and the amount of loss change on the basis of the power difference amount; and
    adjusting the optical power of each of a plurality of pumping channels in the pumping light on the basis of the amount of loss change and the slope of the approximate line.

4. A method according to claim 3, wherein in said adjusting step, letting A be the amount of loss change, S be the slope of the approximate line, and $a_m$ and $b_m$ be constants for obtaining a change amount of pumping light power of an m-th (m is an arbitrary integer not less than 1 and not more than M) channel when the number of channels of the pumping light is M (M is an integer not less than 2), the pumping light power of the m-th channel is adjusted on the basis of a change amount obtained by $$a_m \times A + b_m \times S.$$

5. A Raman amplification pumping unit configured for amplifying signal light of a plurality of channels which are included in a predetermined wavelength band and which have different wavelengths by supplying pumping light of a plurality of channels having different wavelengths to an optical transmission path through which the signal light propagates, comprising:
    a plurality of pumping light sources each outputting a light component of an associated pumping channel as the pumping light;
    a photodetector configured for detecting powers of at least light components having two wavelengths of propagating light containing the amplified signal light; and
    an adjusting section configured for adjusting an optical power of each of a plurality of pumping channels in the pumping light so as to make an optical power of the amplified signal light constant in the predetermined wavelength band, on the basis of both a power of at least a light component having one wavelength of the light components having the two wavelengths which are detected by said photodetector and a power difference amount between the detected light components having the two wavelengths.

6. A unit according to claim 5, wherein said adjusting section prepares a table in which an appropriate pumping light power is made to correspond to the detected power of the light component and the power difference amount for each of the plurality of pumping channels, and obtains an optical power of each pumping channel in the pumping light from the detected power of the light component and the power difference amount by using the table.

7. A unit according to claim 5, further comprising:
    a first calculator calculating an amount of loss change which is a difference between a predetermined predicted loss amount and an actual loss amount in propagating light in the optical transmission path on the basis of the detected power of the light component;
    a second calculator calculating a slope of an approximate line representing a correlation between a wavelength and the amount of loss change on the basis of the power difference amount; and
    an adjusting section which adjusts the optical power of each of a plurality of pumping channels in the pumping light on the basis of the amount of loss change and the slope of the approximate line.

8. A unit according to claim 7, wherein letting A be the amount of loss change, S be the slope of the approximate line, and am and bm be constants for obtaining a change amount of pumping light power of an m-th (m is an arbitrary integer not less than 1 and not more than M) channel when the number of channels of the pumping light is M (M is an integer not less than 2), said adjusting section adjusts the pumping light power of the m-th channel on the basis of a change amount obtained by $$a_m \times A + b_m \times S.$$

9. A WDM optical communication system, comprising:

an optical transmission path through which signal light of a plurality of channels which are included in a predetermined wavelength band and have different wavelengths propagates; and a Raman amplification pumping unit according to claim 5 which supplies pumping light of a plurality of channels having different wavelengths to said optical transmission path.

10. A Raman amplification method according to claim 1, wherein a Raman gain is controlled by monitoring the light components having different wavelengths, the number of the light components monitored being less than the number of channels in the pumping light.

11. A Raman amplification method according to claim 1, wherein a Raman gain is controlled such that a gain spectrum shape becomes flat, with respect to a loss fluctuation in the optical transmission path.

* * * * *